US009600713B2

(12) United States Patent
Estey et al.

(10) Patent No.: US 9,600,713 B2
(45) Date of Patent: Mar. 21, 2017

(54) IDENTIFICATION AND PROCESSING OF FACIAL WRINKLES IN A DIGITAL IMAGE

(71) Applicant: AprilAge Inc., Toronto OT (CA)

(72) Inventors: Ronald Estey, Toronto (CA); Fang Chen, North York (CA); Chris Ellefson, Toronto (CA)

(73) Assignee: APRILAGE INC., Toronto, Ontario (CA)

( * ) Notice: Subject to any disclaimer, the term of this patent is extended or adjusted under 35 U.S.C. 154(b) by 0 days.

(21) Appl. No.: 14/696,646

(22) Filed: Apr. 27, 2015

(65) Prior Publication Data

US 2016/0314342 A1   Oct. 27, 2016

(51) Int. Cl.
 *G06K 9/00* (2006.01)
 *G06T 7/00* (2017.01)

(52) U.S. Cl.
 CPC ..... *G06K 9/00234* (2013.01); *G06K 9/00248* (2013.01); *G06T 7/0081* (2013.01); *G06T 2207/30201* (2013.01)

(58) Field of Classification Search
 CPC ............ G06K 9/00248; G06K 9/00234; G06T 7/0081; G06T 2207/30201
 USPC ................................................ 382/118, 218
 See application file for complete search history.

(56) References Cited

U.S. PATENT DOCUMENTS

| 6,272,231 B1 * | 8/2001 | Maurer .............. G06K 9/00228 382/103 |
| 7,336,810 B2 * | 2/2008 | Fujii ..................... A61B 5/0059 356/369 |
| 8,218,896 B2 * | 7/2012 | Park ...................... H04N 9/646 382/167 |
| 8,290,257 B2 | 10/2012 | Demirli et al. |
| 8,391,639 B2 | 3/2013 | Hillebrand et al. |
| 2012/0133753 A1 * | 5/2012 | Chang ................ G06K 9/00221 348/77 |

OTHER PUBLICATIONS

Zhang, et al. (Reconstruction of Human Face for Different Age Based on the Log-gabor Wavelet), IEEE, 2008,pp. 354-357.*

* cited by examiner

*Primary Examiner* — Daniel Mariam
(74) *Attorney, Agent, or Firm* — Gilbert's LLP; Matthew D. Powell

(57) ABSTRACT

A computer-implemented method of processing an input digital image is provided. The method includes forming a representation of the input digital image as wavelet components; and for each of a plurality of facial regions in the input digital image: forming a reconstructed facial region based on a subset of the wavelet components; and identifying pixels associated with facial wrinkles in the facial region as pixels In the reconstructed facial region that differ from corresponding pixels in the facial region by a first threshold amount.

19 Claims, 11 Drawing Sheets

FIG. 4

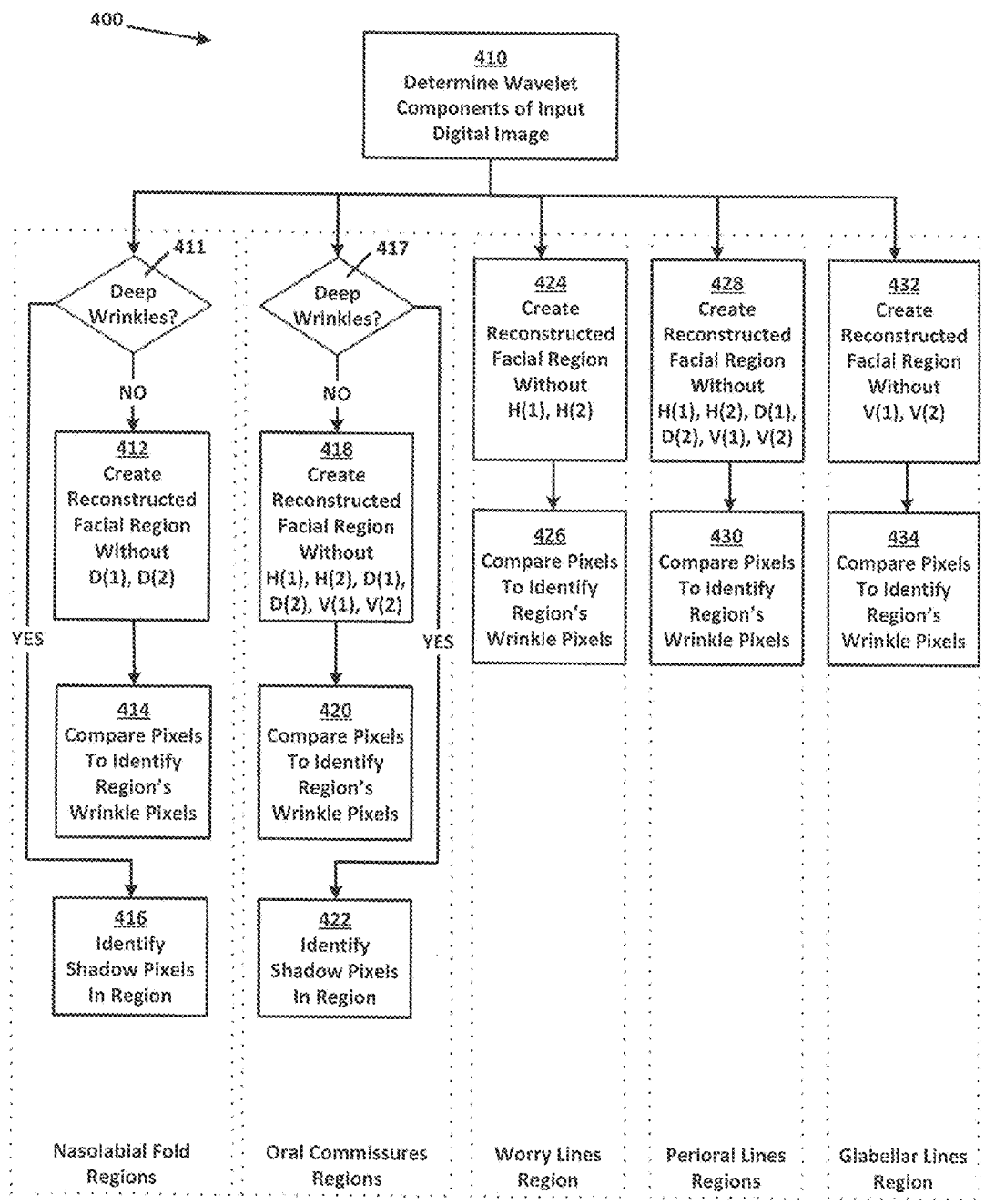

IDENTIFICATION AND PROCESSING OF FACIAL WRINKLES IN A DIGITAL IMAGE

FIELD OF THE INVENTION

Embodiments of the present invention relate generally to image processing, and more particularly to identification and processing of facial wrinkles in a digital image.

BACKGROUND OF THE INVENTION

Computer-based tools are available for providing users wish predictions, in the digital domain, about the results of an actual procedure that will affect the physical appearance of a subject. For example, software is available for enabling a subject to visualize how they might look if they were to undergo a particular cosmetic procedure, in order to help the subject decide whether and how to proceed.

One type of computer-based tool enables a user to apply basic global smoothing to an input digital image of the subject's face with a view to enabling the subject to see how the subject might look with, fewer wrinkles. Such a tool is known to be used in the publishing industry for removing facial blemishes from photographs prior to publication, rather than as a precursor to an actual physical procedure.

Unfortunately, basic computer-based smoothing techniques such as global removal of high frequency components from an image of the subject can produce effects in the digital domain that differ significantly from what are to be the actual results of physical procedures. For example, such basic smoothing techniques do not take into account that wrinkles in different regions of a patient's face have respective different patterns and characteristics. Subjects can be reluctant to proceed with a physical procedure when the digital domain predictions as to the outcomes of the procedure do trot correlate well with actual physical outcomes. For those that do proceed, the risk of disappointment due to the disparities is high.

Other methods for providing predictions as to what a person will look like under particular conditions are known. For example, U.S. Pat. No. 8,290,252 to Demirli et el. discloses a method and system for simulating the progress or worsening of facial skin features that contribute to the overall look and condition of the skin. Demirli et al. propose to use two close-up photographs of the lace: one captured with a digital camera in standard white light, and the other captured with the same camera in UV light. These images are processed to simulate the progress or worsening of the major skin features, such as hyperpigmented spots, wrinkles and small texture features.

White methods have been proposed for providing predictions about the results of an actual procedure, improvements are desirable.

SUMMARY OF THE INVENTION

In accordance with an aspect there is provided a computer-implemented method of processing an input digital image, the method comprising forming a representation of the input digital Image as wavelet components; said for each of a plurality of facial regions in the input digital image: forming a reconstructed facial region based on a subset of the wavelet components; and identifying pixels associated with facial wrinkles in the facial region as pixels in the reconstructed facial region that differ from corresponding pixels in the facial region by a first threshold amount.

In an embodiment, a modified digital image is formed based on the input digital image and modified values of pixels identified as associated with facial wrinkles. In an embodiment, the pixel value modifications are directed by a user.

In accordance with another aspect, there is provided a non-transitory computer readable medium embodying a computer program executable on a computing system for processing an input digital image, the computer program comprising: computer program code for forming a representation of the input digital image as wavelet components; and computer program code for, for each of a plurality of facial regions in the input digital image: forming a reconstructed facial region based on a subset of the wavelet components; and identifying pixels associated with facial wrinkles in the facial region as pixels in the reconstructed facial region that differ from corresponding pixels hi the facial region by a first threshold amount.

In an embodiment, there is provided computer program code for forming a modified digital image based on the input digital image and modified values of pixels identified as associated with facial wrinkles. In an embodiment, the pixel value modifications are directed by a user.

In accordance with another aspect, there is provided a computing system comprising at least one processor executing instructions for processing an input digital image, the at least one processor configured therewith to form a representation of the input digital image as wavelet components and, for each of a plurality of facial regions in the input digital image, form a reconstructed facial region based on a subset of the wavelet components and identify pixels associated with facial wrinkles in the facial region as pixels in the reconstructed facial region that differ from corresponding pixels in the facial region by a first threshold amount.

In an embodiment, the at least one processor is further configured to form a modified digital image based on the input digital image and modified values of pixels identified as associated with facial wrinkles. In an embodiment, the pixel value modifications are directed by a user.

Other aspects and advantages will become apparent from the following.

BRIEF DESCRIPTION OF THE DRAWINGS

Embodiments of the invention will now Be described with reference to the appended drawings in which:

FIG. 4 is a screenshot of a user interface screen for enabling a user to select the gender, ethnicity and age of the subject depicted in the selected input digital image;

FIG. 11 is a flowchart showing details of steps for the identification of modifiable pixels in a number of facial regions.

DETAILED DESCRIPTION

Figure 1:
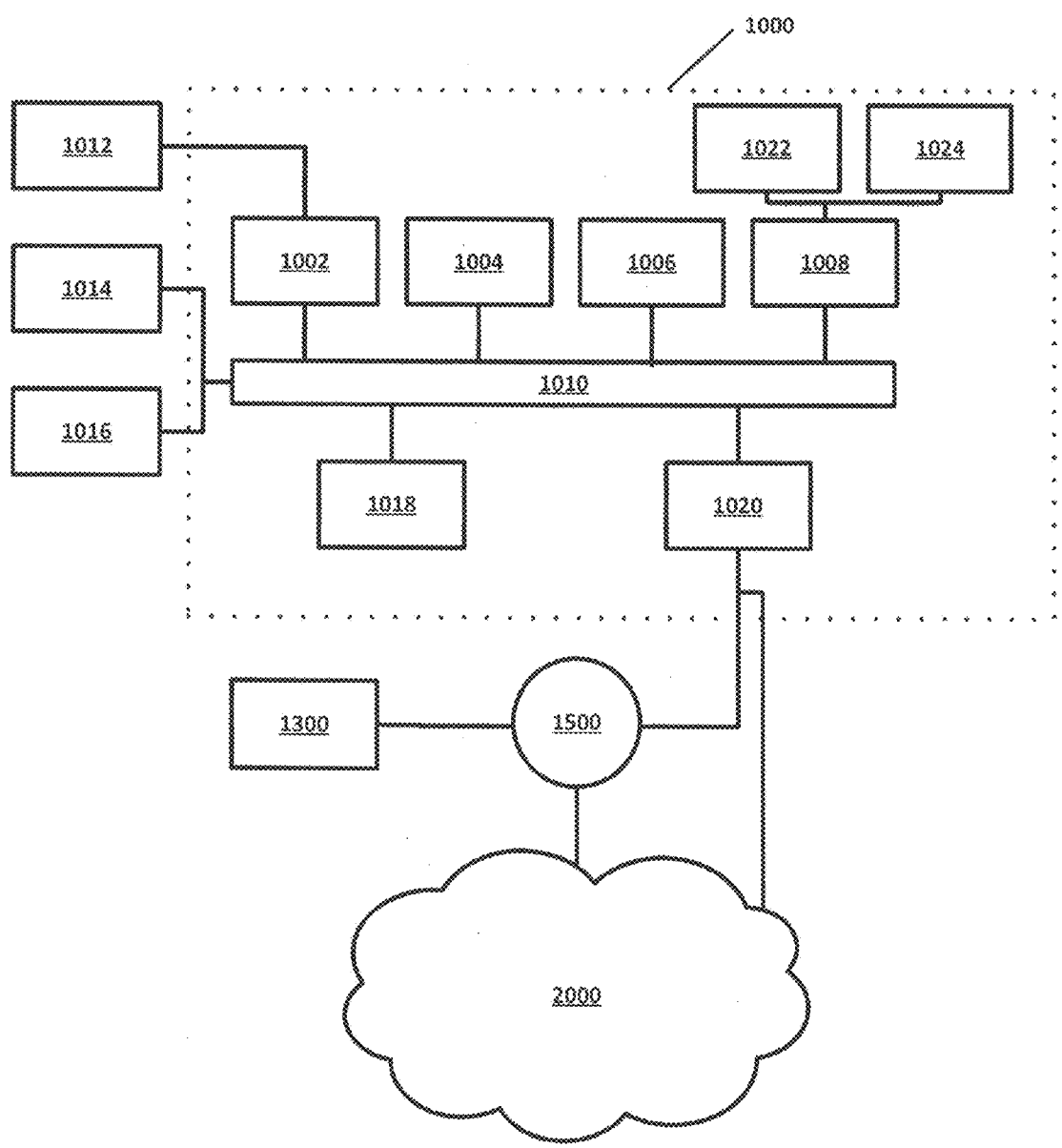
FIG. 1 is a schematic diagram of an exemplary computing system configured to implement embodiments of the invention.

Described herein is a computer-implemented method 90 of processing an input digital image. In this embodiment, the method is executed on a special purpose computing system 1000 such as that shown in FIG. 1. In this embodiment, computing system 1000 includes a bus 1010 or other communication mechanism for communicating information, and a processor 1018 coupled with the bus 1010 for processing the information. The computing system 1000 also includes a main memory 1004, such as a random access memory (RAM) or other dynamic storage device (e.g., dynamic RAM (DRAM), static RAM (SRAM), and synchronous DRAM (SDRAM)), coupled to the bus 1010 for storing information and instructions to be executed by processor 1018. In addition, the main memory 1004 may be used for storing temporary variables or other intermediate information during the execution of instructions by the processor 1018. Processor 1018 may include memory structures such as registers for storing such temporary variables or other intermediate information during execution of instructions. The computing system 1000 further includes a read only memory (ROM) 1006 or other static storage device (e.g., programmable ROM (PROM), erasable PROM (EPROM), and electrically erasable PROM (EEPROM)) coupled to the bus 1010 for storing static information and instructions for the processor 1018.

The computing system 1000 also includes a disk controller 1008 coupled to the bus 1010 to control one or more storage devices for storing information and instructions, such as a magnetic hard disk 1022, and a removable, media drive 1024 (e.g., floppy disk drive, read-only compact disc drive, read/write compact disc drive, compact disc jukebox, tape drive, and removable magneto-optical drive). The storage devices may be added to the computing system 1000 using an appropriate device interface (e.g., small computing system interface (SCSI), integrated device electronics (IDE), enhanced-IDE (E-IDE), direct memory access (DMA), or ultra-DMA).

The computing system 1000 may also include special purpose logic, devices (e.g., application specific integrated circuits (ASICs)) or configurable logic devices (e.g., simple programmable logic devices (SPLDs), complex programmable logic devices (CPLDs), and field programmable gate arrays (FPGAs)).

The computing system 1000 may also include a display controller 1002 coupled to the bus 1010 to control a display 1012, such as a liquid crystal display (LCD) screen, for displaying information to a computer user. The computing system 1000 includes input devices, such as a keyboard 1014 and a pointing device 1016, for interacting with a computer user and providing information to the processor 1018. The pointing device 1016, for example, may be a mouse, a trackball, or a pointing stick for communicating direction information and command selections to the processor 1018 and for controlling cursor movement on the display 1012. In addition, a printer may provide printed listings of data stored and/or generated by the computing system 1000.

The computing system 1000 performs a portion or all of the processing steps in response to the processor 1018 executing one or more sequences of one- or more instructions contained, in a memory, such as the main memory 1004. Such instructions may be read into the main memory 1004 from another computer readable medium, such as a hard disk 1022 or a removable media drive 1024. One or more processors in a multi-processing arrangement may also be employed to execute the sequences of instructions contained in main, memory 1004. In alternative embodiments, hard-wired circuitry may be used in place of or in combination with software instructions. Thus, embodiments are not limited to any specific combination of hardware circuitry and software.

The computing system 1000 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media is software for controlling, the computing system 1000, for driving a device or devices for implementing the invention, and for enabling the computing system 1000 to interact with a human user (e.g., by providing user interface screens and controls). Such software may include, but is trot limited to, device drivers, operating systems, development tools, and applications software. Such computer readable media further includes the computer program product of the present invention for performing ail or a portion (if processing is distributed) of the processing performed in implementing the invention.

The computer code devices of the present invention may be any interpretable or executable code mechanism, including but trot limited to scripts, interpretable programs, dynamic link, libraries (DLLs), Java classes, and complete executable programs. Moreover, parts of the processing of the present invention may be distributed for better performance, reliability, and/or cost.

A computer readable medium providing instructions to a processor 1018 may take many forms, including but not limited to, non-volatile media, volatile media, and transmission media. Non-volatile media includes, for example, optical, magnetic disks, and magneto-optical disks, such as the hard disk 1022 or the removable media drive 1024. Volatile media includes dynamic memory, such as tire main, memory 1004. Transmission media includes coaxial cables, copper wire and fiber optics, including the wires that make up the bus 1010. Transmission media also may also take the form of acoustic or light waves, such as those generated during radio wave and infrared data communications.

Various forms of computer readable media may be involved in carrying out one or more sequences of one or more instructions to processor 1018 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computing system 1000 may receive the data on the telephone line and use an infrared transmitter to convert the data to an infrared signal. An infrared detector coupled to the bus 1010 cart receive the data carried in the infrared signal and place the data on the bus 1010. The bus 1010 carries the data to the main memory 1004, from which the processor 1018 retrieves and executes the instructions. The instructions received by the main memory 1004 may optionally be stored on storage device 1022 or 1024 either before or after execution by processor 1018.

The computing system 1000 also includes a communication interface 1020 coupled to the bus 1010. The communication interface 1020 provides a two-way data communication coupling to a network link that is connected to, for example, a local area network (LAN) 1500, or to the communications network 2000. For example, the communication interface 1020 may be a network interface card to attach to any packet switched LAN. As another example, the communication interface 1020 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1020 sends and receives electrical, electromagnetic or optical signals that carry digital data streams representing various types of information.

The network link typically provides data communication through one or more networks to other data devices. For example, the network link may provide a connection to another computer through a local network 1500 (e.g., a LAN) or through equipment operated by a service provider, which provides communication services through a communications network 2000. The local network 1500 and the communications network 2000 use, for example, electrical, electromagnetic, or optical signals that carry digital data streams, and die associated physical layer (e.g., CAT 5 cable, coaxial cable, optical fiber, etc). The signals through the various networks and the signals on the network link and through the communication interface 1020, which carry the digital data to and from the computing system 1000, may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computing system 1000 can transmit and receive data, including program code, through the network(s) 1500 and 2000, the network link and the communication interface 1020. Moreover, the network link may provide a connection through a LAN 1500 to a mobile device 1300 such as a personal digital assistant (PDA) laptop computer, or cellular telephone.

Alternative configurations of computing system 1000 may be employed. For example, computing system 1000 may be implemented in a tablet computer, thus not for example requiring a keyboard 1014, or some other useful configuration.

Figure 2:
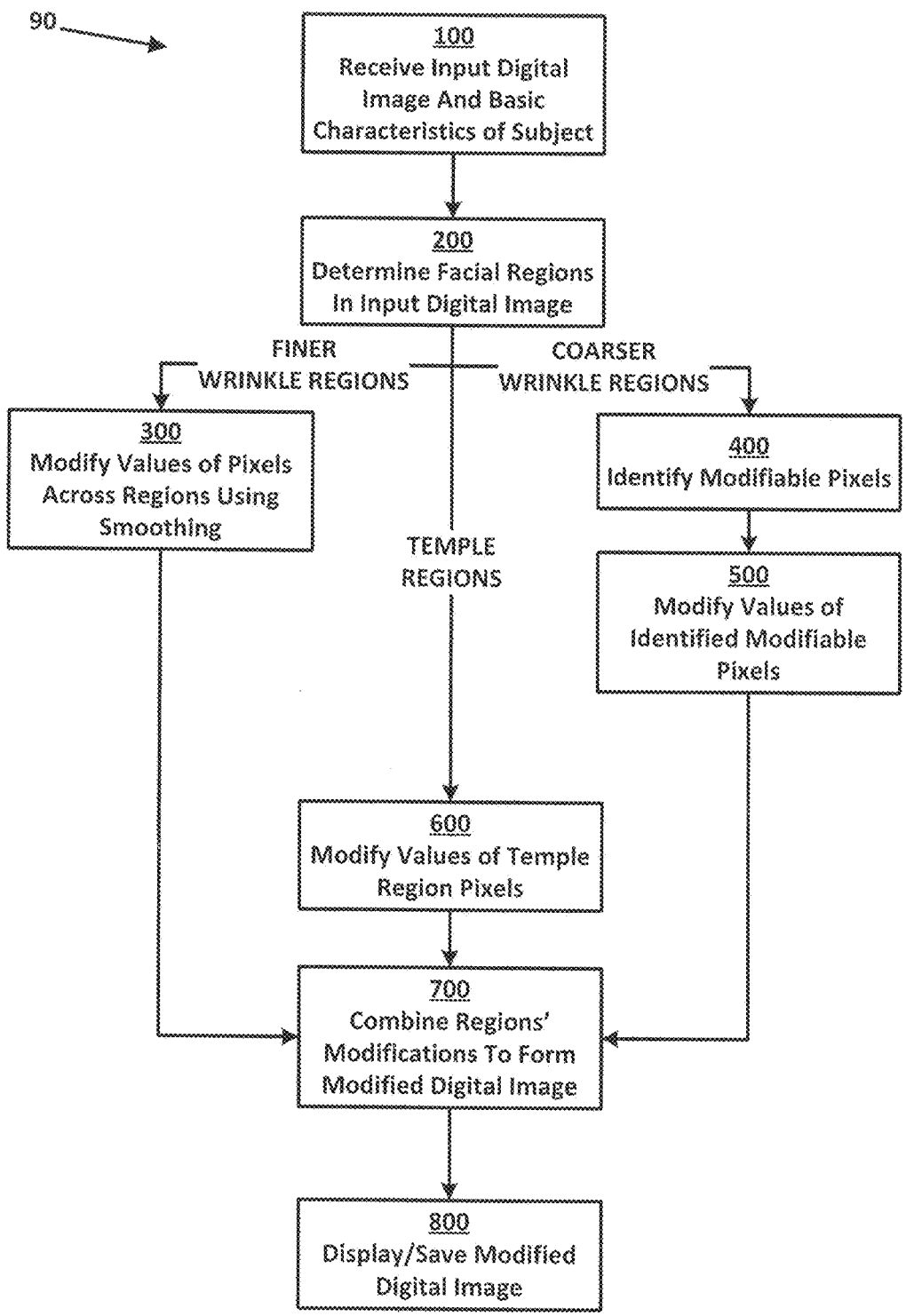
FIG. 2 is a flowchart depicting steps in a computer-implemented method of processing a digital image, according to an embodiment.

FIG. 2 is a flowchart depicting steps in method 90, according to an embodiment. During method 90, an input digital image, in the form of a JPEG, BMP, TIFF, PNG or other suitable digital image format file, and basic characteristics of the subject of the input digital image, are received (step 100).

Figure 3:
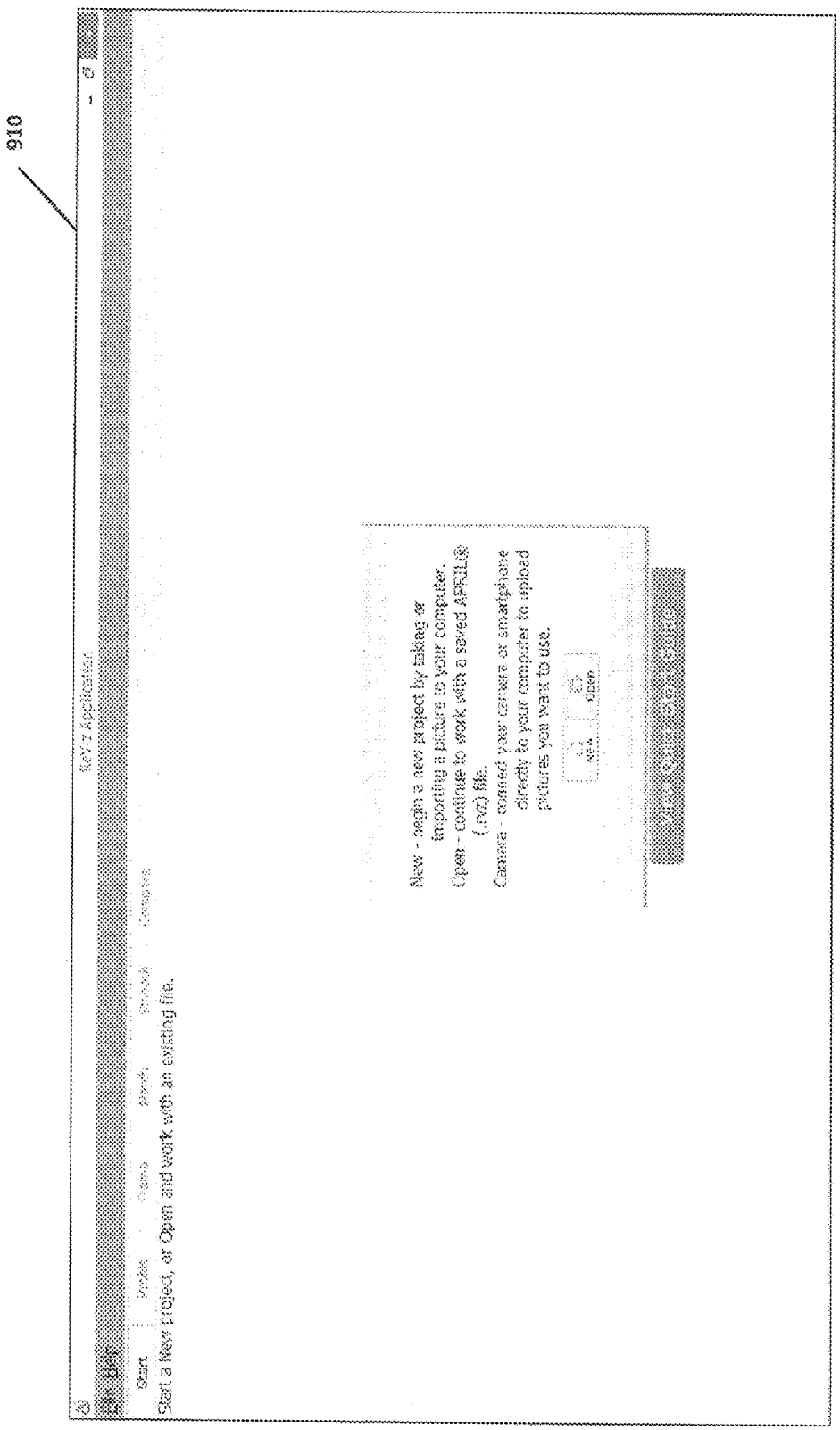
FIG. 3 is a screenshot of a user interlace screen for enabling a user to select an input digital image.
Figure 4:
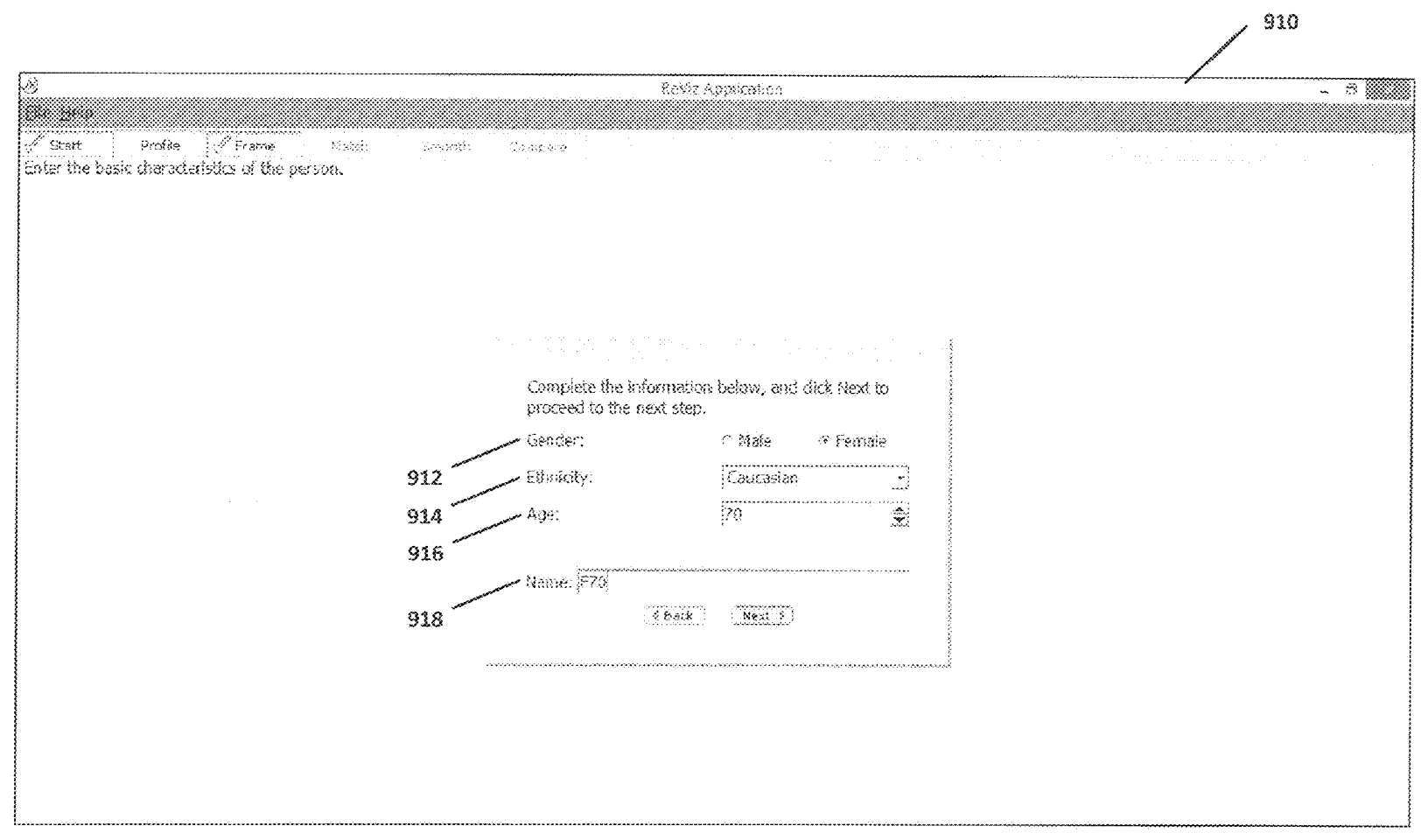

FIGS. 3 and 4 are screenshots of a user interface screen 910 for respectively enabling a user to select an input digital image from a file system and to input tire gender 912, ethnicity 914 and age 916 of the subject who is depicted in the input digital image. Furthermore, as seen in FIG. 4, the user is provided with a text input field 918 within which the user can name a project. Generally, the project is stored in memory of computing system 1000 in one or more data structures and includes the input digital image, current pixel modification settings, sets of wrinkle/shadow pixels, the modified, digital image, user notes and other supporting data. The user, or another user, can retrieve the project at a later time using its name.

Figure 5:
FIG. 5 is a screenshot of a user interface screen for enabling a user to manually identify the subject's facial regions using a facial mask.
Figure 6:
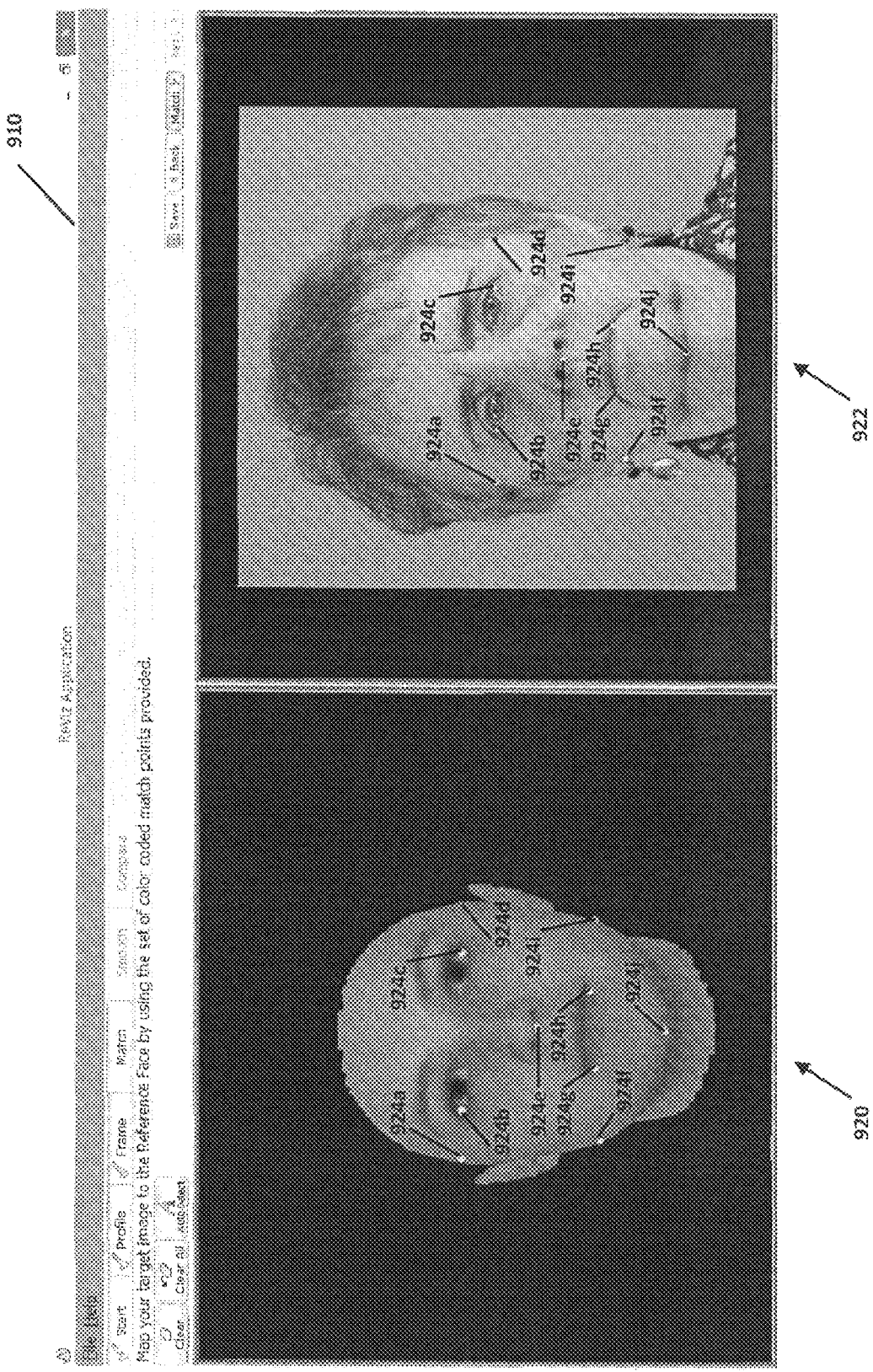
FIG. 6 is a screenshot of a user interface screen for enabling a user to manually identify the subject's facial regions using control points.
Figure 7:
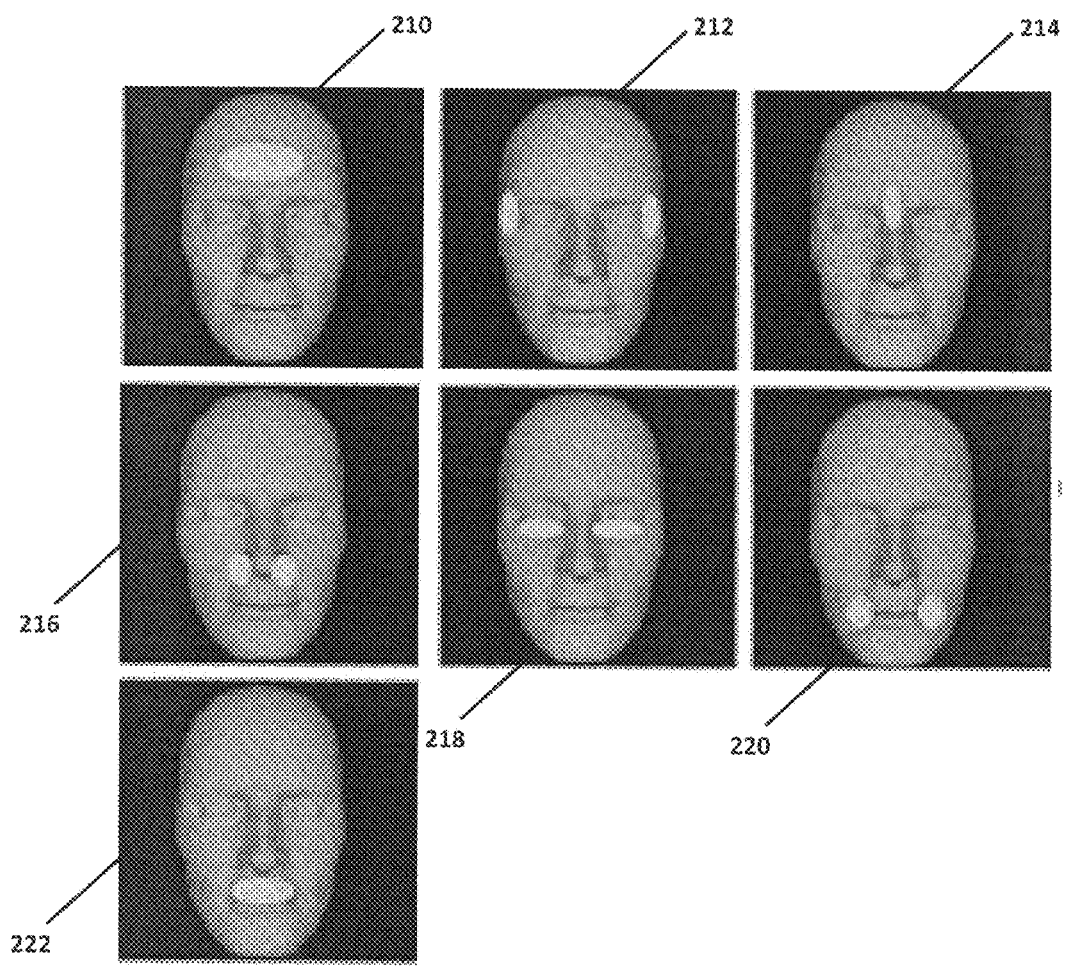
FIG. 7 depicts a number of images each illustrating a respective facial region that can be identified by a user.

With the input digital image and the basic characteristics of the subject having been received at step 100, the subject's facial regions in the input digital image are then determined (200). FIGS. 5 and 6 are screenshots of the user interface screen 910 for enabling a user to manually identify the subject's facial regions. The sizes and positions of the facial regions and, as will be described, control points available to the user for the manual identification are informed partly by an underlying digital model of the subject selected based on the basic characteristics inputted by the user. In this embodiment, the user is provided with an, image 920 of a Reference Face (on the left) and is able to re-position the image 920 so as to correspond in position and scale to the face in the input digital image 922 (on the right). As shown in FIG. 6, multiple facial regions are identified by a user by using die image 920 as a mask, and colour-coded control points 924a to 924j. FIG. 7 shows images illustrating various facial regions that can be determined using die mask and control points 924a to 924j. These include image 210 showing the Worry Lines Region, image 212 showing the Temple regions, image 214 showing the Glabellar Lines Region, image 216 showing the Nasolabial Folds regions, image 218 showing the Under Eye regions, image 220 showing the Oral Commissures regions, and image 222 showing the Perioral Lines Region.

With the facial regions having been determined at step 200, the input digital image is subjected to further processing. For regions in which finer wrinkles are expected, winch in this embodiment include the Periorbital Lines region and the Under Eye regions, the further processing includes user-controllable smoothing of the respective regions using Gaussian blurring (step 300). In particular, the Gaussian, blurring uses a Gaussian filter in order to calculate a transformation to apply to pixels in die region, in this embodiment, for RGB (Red, Green, Blue) channels in an input digital image having a dimension of 512×215 pixels, the variance of the Gaussian Liter for the Periorbital Lines regions is 1.8, and the variance of the Gaussian filter for the Under Eye regions is 1.0. It will be understood that the user is able to control whether to apply any smoothing, on a region by region basis.

For coarser wrinkles regions, the further processing includes identification of modifiable pixels in the regions (step 400), and then user-controllable modifications to the colour values of the identified modifiable pixels (step 500), each of which will be described in further detail below.

In this embodiment, the coarser wrinkle regions include the Nasolabial Folds regions, the Oral Commissures regions, the Worry Line Region, the Periorol Lines Region, and the Glabellar Lines regions. As will be described in further detail herein, two different sets of modifiable pixels can be identified for some of these regions: a set of wrinkle pixels and a set of shadow pixels. The flexibility for defining the two different sets of pixels is provided for facial regions with features that tend to cause shadows. Providing the user with a set of wrinkle pixels or a set of shadow pixels enables the user to choose whether to modify identified shadow pixels in a region or whether to modify identified wrinkle pixels in the region. It will be understood that the user is also able to control whether or not to apply any modifications to the colour values of the identified modifiable pixels, on a region by region basis.

For the Temple regions, the further processing includes user-controllable modifications to the colour values of the pixels in the Temple regions in order to depict different levels of any user-controlled volumnization of the subject's temples (step 600). It mil be understood that the user may choose not to apply any temple volumnization, on a region, by region basis.

The selective modification of pixel values in the regions as described above are aggregated in real-time to form a modified digital image (step 700), which is continuously updated and displayed according to the modifications, and which may be saved (step 800). Using the user interface screen 910, the user is able to adjust the modifications to pixels in various regions and receive immediate visual feedback. Once the user is satisfied with the modifications, the user may save the modified digital image for future reference.

Figure 8:
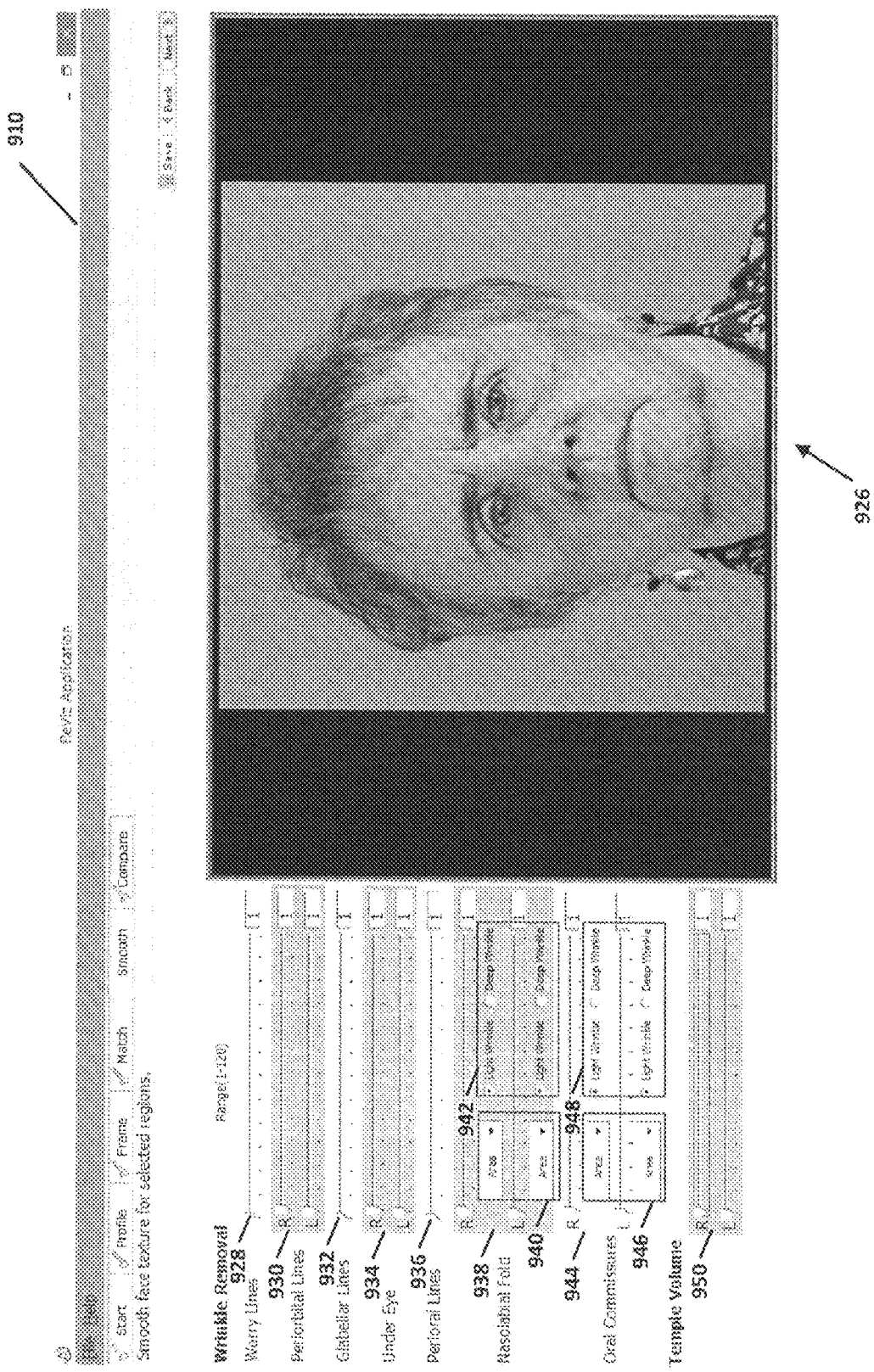
FIG. 8 is a screenshot of a user interface screen providing user controls for controlling a degree of smoothing in finer wrinkle regions, a degree of wrinkle/shadow pixel colour changes in coarser wrinkle regions, and a degree of temple volumnization.

FIG. 8 is a screenshot showing the user interface screen 910 displaying user controls for controlling the degree of smoothing in the finer wrinkle regions, the degree of wrinkle pixel colour, changes in the coarser wrinkle regions, and the degree of temple volumnization. The user can manipulate the user controls to control the appearance of the subject in a modified digital image 926. In particular, a slider 928 is provided for controlling the degree of pixel colour changes in the Worry lines region, left and right sliders 930 are provided for controlling the degree of smoothing for respective Periorbital Lines regions, a slider 932 is provided for controlling the degree of pixel colour changes in the Glabellar Lines region, left and right sliders 934 are provided for controlling the degree of smoothing in respective Under Eye regions, a slider 936 is provided for controlling the degree of pixel colour changes in the Perioral. Lines region, left and right sliders 938 are provided for controlling the degree of pixel colour changes in respective Nasolabial Fold regions, left and right sliders 944 are provided for controlling the degree of pixel colour changes in respective Oral Commissures regions, and left and right sliders 950 are provided for controlling the degree of temple volumnization in the Temple regions.

Figure 9:
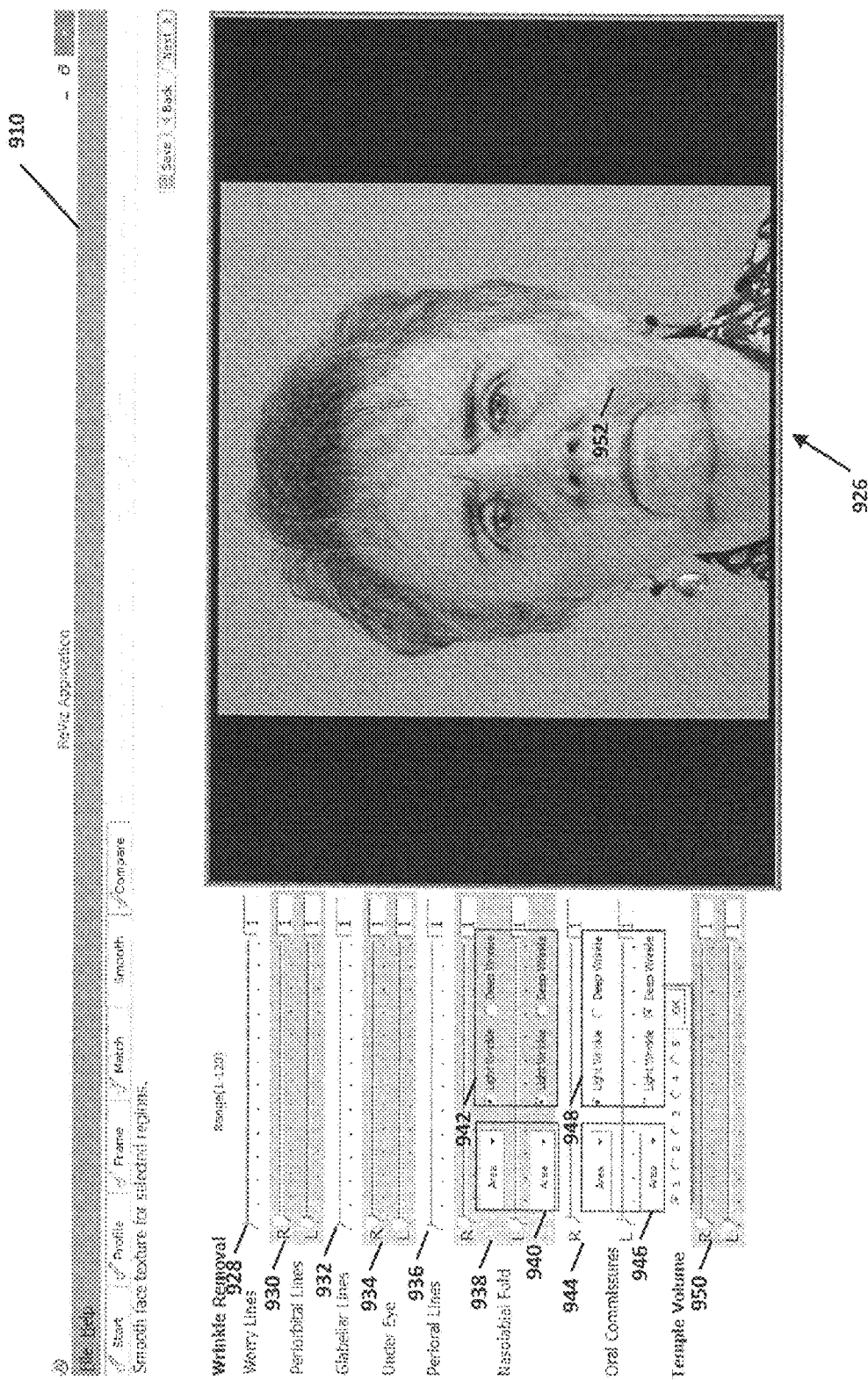
FIG. 9 is a screenshot of the user interface screen of FIG. 8 being used to fine-tune the area of a particular facial region.

For each of the two Nasolabial Fold regions and each of the two Oral Commissures regions, there is both an additional Area Control (940 and 946, respectively), and a Light or Deep Wrinkle Control (942 and 948, respectively). FIG. 9 is a screenshot showing the use of Area Control 946 for the Left Side Oral Commissure Region. With, this control, the user is able to fine-tune the boundaries of the Left Side Oral Commissure region in order to enable fitting the detection of wrinkles and shadows, and their adjustments, around the mouth. The lute-tuning enables wrinkle reduction processing to more accurately address wrinkles around the mouth without impinging on the opening of the mouth itself. During adjustments of the Area Control 946, a shaded area 952 is shown overlying the modified digital image 926 to provide visual feedback to the user about the fine-tuning. Each Area Control provides control mainly over the shape of the region, the size of the region, and the size of the notch in the region that is to accommodate the side of the mouth or the side of the nose. Identification of wrinkle and shadow pixels, as well as their adjustments, are conducted only within the region.

In this embodiment, the Area Control 946 for each of the Left and Right Side Oral Commissure regions provides five (5) levels of fine-tuning, and the Area Control 940 for each, of the Left and Right Side Nasolabial Fold regions that provides three (3) levels of fine-tuning.

Figure 10:
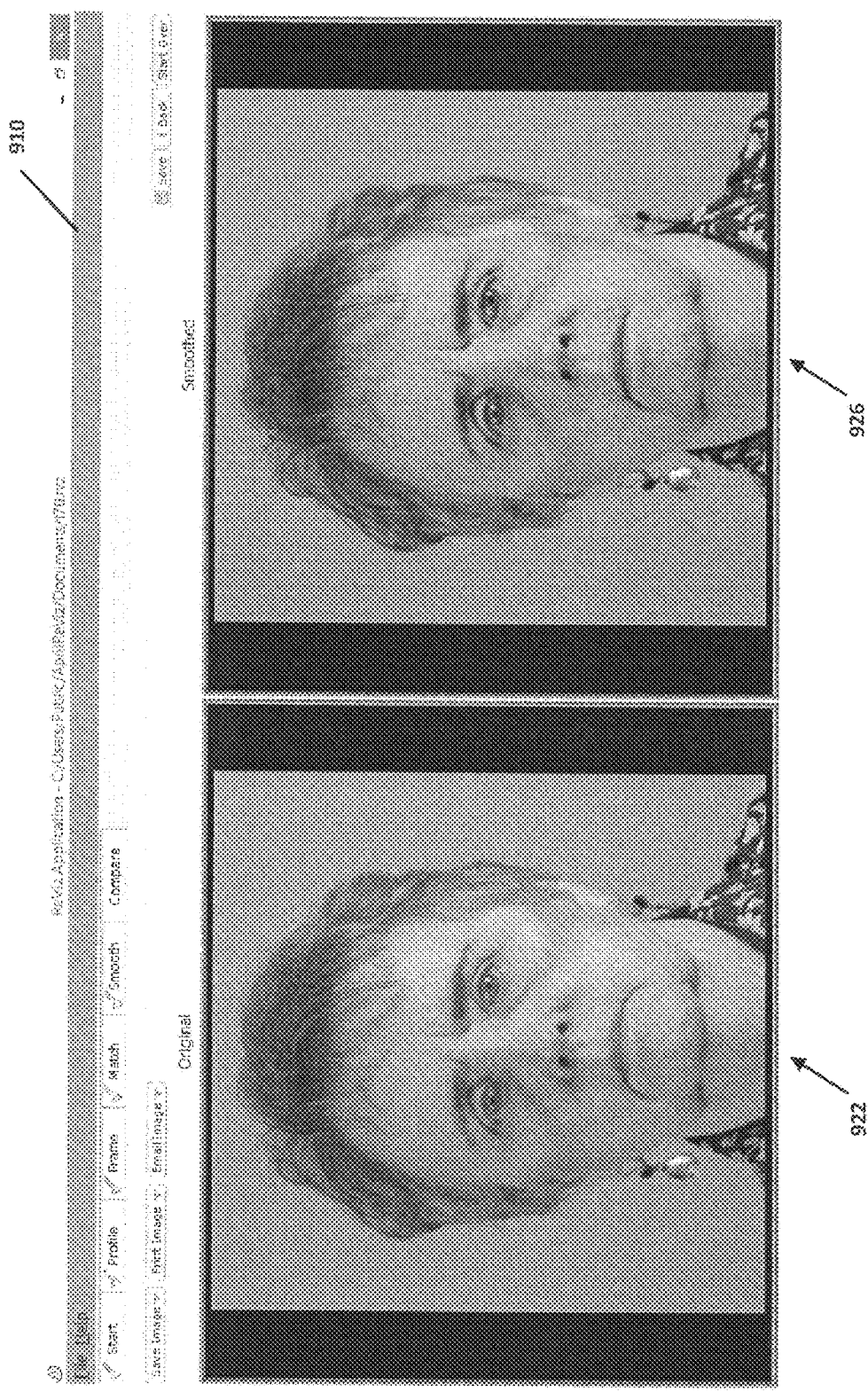
FIG. 10 is a screenshot of a user interface screen showing side-by-side before and after comparisons thereby to enable a user to visually compare a modified digital image to the input digital image.

FIG. 10 is a screenshot of a "before and after" comparison screen that enables a user to visualize the modified digital image 926 in comparison, with the input digital image 922. The input digital image 922 is shown on the left as "Original" and the modified digital image 926 is shown on the right as "Smoothed".

FIG. 11 is a flowchart showing steps for the identification of modifiable pixels in step 400, in further detail.

It has been observed that, in facial images, nasolabial folds (left and right), oral commissures (left and right), worry lines, perioral lines, and glabellar lines manifest themselves as deep wrinkles oriented in respective directions. In particular, nasolabial folds typically manifest themselves as diagonal lines, oral commissures have complicated line patterns but also typically manifest themselves as deep lines extending downwardly from the mouth corner, worry lines typically manifest themselves as horizontal lines, perioral lines typically manifest themselves as lines in various directions, and glabellar lines typically manifest themselves as vertical lines.

According, to this embodiment, two-dimensional wavelets are employed as discrete-time filters for enabling detection of wrinkle pixels in accordance with the expected orientation of wrinkles in respective facial regions. As will be appreciated, a wavelet transform of a function or signal h(t) is a representation of the function or signal as wavelets ψ(t), as shown in Equations 1 and 2 below:

$$\psi_{j,k}(t) = 2^{j/2} \psi(2^j t - k) \quad (1)$$

where $$\psi \in L^2(R); \text{ and}$$

$$j, k \in Z$$

$$h(t) = \sum_{j,k=-\infty}^{\infty} c_{jk} \psi_{jk}(x) \quad (2)$$

where:

$c_{jk}$ are wavelet-coefficients.

A Discrete Wavelet Transform ("DWT") is used to represent the input digital image as a set of scale components, referred to as wavelet coefficients, that each represent the information in the input digital image that corresponds to a respective frequency range. Derivative digital images, or regions thereof as in this embodiment, can be reconstructed from, the wavelet components in various ways, for various purposes, using various combinations of the wavelet components. For example, if high-frequency components of the input digital image or region are not of interest for a reconstruction, only those wavelet components of the input digital image or region representing all but the high-frequency components are used to form a reconstructed digital, image or region. Where overall image smoothing and de-noising is desirable, for example, a reconstruction may be done without the highest-frequency components.

It has been observed, based on frequency analysis of numerous images of faces, that regions observed to contain wrinkles contain lower-frequency components that are not found in regions observed to be absent of such wrinkles. It has also been observed that reconstruction of digital images using only higher-frequency components yields an observable reduction in the appearance of wrinkles. Based on this, it has been determined that wrinkle pixels may be detected by comparing pixel values in a region of an input digital image to corresponding pixel values in suitably reconstructed regions.

In this embodiment, the Daubechies 2 wavelet (db2) function is employed to determine wavelet components of the input digital image (step 410). In particular, using db2 both Approximation Coefficients (A) and Detail Coefficients are determined. The Detail Coefficients at three (3) frequency levels are determined, with each level having three directions (horizontal (H), vertical (V), and diagonal (D)). For the Detail Coefficients, the frequency range increases from level 1 to level 3. As such, the input digital image may be represented as wavelet: components [A, H(1), V(1), D(1), H(2), V(2), D(2), H(3), V(3), D(3)].

As discussed above, for each of the Nasolabial Fold regions and each of the Oral Commissures regions, the user is able to select the Light Wrinkle or Deep Wrinkle radio box controls 942 and 948. This provides the user with the ability to have the computing system 1000 either identify respective pixels attributable to wrinkles (where Deep Wrinkles is not selected at step 411 and/or step 417), or to identify respective pixels attributable to shadows (where Deep Wrinkles is selected at step 411 and/or step 417).

During the identification of shadow pixels at steps 416 and 422, the value of the HSV space V-channel of each pixel in the respective region is compared to a threshold value and, if the pixel value is below the threshold value, it is considered attributable to shadow. Otherwise, the pixel is considered not attributable to shadow. The threshold value is calculated adaptively based on the percentage of pixels in shadows and in the facial area in the region, in particular, in this embodiment the threshold amount is calculated as the amount of pixel value difference between pixels that would cause less than 75% of the pixels in the region to be shadow pixels and the rest of the pixels in the region to be non-shadow pixels. When a pixel is considered attributable to shadow, it is made available for modification by the user, it will be understood that the particular percentage for the threshold in other embodiments may be somewhat less than or somewhat more than 40%, or may be some other percentage depending on the needs of the particular implementation.

For the Worry Lines region, the Perioral Line regions and the Glabellar Lines regions, as well as one or both of the Nasolabial Fold regions in the event, that Deep Wrinkles is not selected and one or both of the Oral Commissures regions in the event that Deep Wrinkles is not selected, wrinkle pixels are then identified. On a region by region basis, reconstructed regions are formed using only those wavelet components that do not correspond to the direction and frequency properties of a wrinkle pattern expected in the region, as shown in Table 1 below:

TABLE 1

| FACIAL REGION | WRINKLE PATTERN | WAVELET CO-EFFS TO REMOVE | WAVELET CO-EFFS FOR RECONSTRUCTION |
|---|---|---|---|
| Nasolabial Folds regions | D | D(1), D(2) | [A, H(1), V(1), H(2), V(2), H(3), V(3), D(3)] |
| Oral Commissures legions | H, V, D | H(1), H(2), V(1), V(2), D(1), D(2) | [A, H(3), V(3), D(3)] |
| Worry Lines Region | H | H(1), H(2) | [A, V(1), D(1), V(2), D(2), H(3), V(3), D(3)] |
| Perioral Lines regions | H, V, D | H(1), H(2), V(1), V(2), D(1), D(2) | [A, H(3), V(3), D(3)] |
| Glabellar Lines Region | V | V(1), V(2) | [A, H(1), D(1), H(2), D(2), H(3), V(3), D(3)] |

The regions' pixels in respective reconstructed regions are then compared with the corresponding regions' pixels in the input digital image regions to identify those pixels that are attributable to wrinkles in the input digital image. In this embodiment, while pixels have a Red channel, a Blue channel, and a Green channel, only the Red channel values for pixels are compared. Those pixels whose Red channel values differ by a threshold amount, and not just any amount, are identified as wrinkle pixels.

In this embodiment, the threshold amount of pixel value difference is adapted to the contents of the facial region being processed, rather than fixed at a particular absolute amount. This provision enables the threshold amount to be established differently for different images taken under different lighting conditions, etc. In this embodiment, for each facial region for which wrinkle pixels are being identified, a difference image is constructed from the pixels in the facial region and the pixels in the reconstructed facial region. The difference image will contain pixels of various values, since various differences may be present. The threshold amount: of pixel value difference to register a difference as representative of a wrinkle pixel in the facial region is calculated as the amount of difference in pixel value that would yield a particular percentage of wrinkle pixels in the difference image.

In this embodiment, for the Nasolabial Folds regions, the Worry Lines Region, the Perioral lines regions and the Glabellar Lines Region, the particular percentage is 40%. For example, for the left Nasolabial Folds Region, the threshold amount is calculated as the amount of pixel value difference between pixels that would cause more than 40% of the pixels in the difference image to be wrinkle pixels and the rest of the pixels in the difference image to be non-wrinkle pixels. In this embodiment, for the Oral Commissures regions, the particular percentage is 60%, such that the threshold amount is calculated as the amount of pixel value difference between pixels that would cause more than 60% of the pixels in the difference image to be wrinkle pixels and the rest of the pixels in the difference image to be non-wrinkle pixels.

It will be understood that, the particular percentages for the threshold in other embodiments may be somewhat less than or somewhat more than 40%, somewhat less than or somewhat more than 60%, respectively, or may be some other ratio depending on the needs of the particular implementation.

In accordance with the above, therefore, for each of the Nasolabial Fold regions, a reconstructed region is created using all but the D(1) and D(2) wavelet components (step 412), and the pixels in the reconstructed regions are compared to corresponding pixels in the Nasolabial Fold regions in the input digital image to identify wrinkle pixels in the Nasolabial Fold regions (step 414). It is these wrinkle pixels that are available to the user to modify as will be described.

Similarly, for each of the Oral Commissures regions, a reconstructed region is created using all but the H(1), H(2), D(1), D(2), V(1) and V(2) wavelet components (step 418), and the pixels in the reconstructed regions are compared to corresponding pixels in the Oral Commissure regions in the input digital image to identify wrinkle pixels in the Oral Commissures regions (step 420). These wrinkle pixels are also made available its die user to modify as will be described.

For the Worry Lines Region, a reconstructed region is created using all but the H(1) and H(2) wavelet components (step 424), and the pixels in the reconstructed region are compared to corresponding pixels in the Worry Lines Region in the Input digital image to identity wrinkle pixels in the Worry Lines Region (step 426). These wrinkle pixels are also made available to the user to modify as will be described.

For the Perioral Lines regions, a reconstructed region is created using all but the H(1), H(2), D(1), D(2), V(1) and V(2) wavelet components (step 428), and the pixels in the reconstructed regions are compared to corresponding pixels in die Perioral Lines regions in the input digital image to identify wrinkle pixels in the Perioral Lines regions (step 430). These wrinkle pixels are also made available to the user to modify as will be described.

For the Glabellar lines Region, a reconstructed region is created using all but the V(1) and V(2) wavelet components (step 432), and the pixels in the reconstructed region are compared to corresponding pixels in the Glabellar Lines Region in the input digital image to identify wrinkle pixels in the Glabellar Lines Region (step 434). These wrinkle pixels are also made available to the user to modify as will be described.

During modification of identified modifiable pixels at step 500, in response to user input via the user controls a method of pixel flooding is employed. More particularly, in response to user input the values of the Red, Green and Blue channels of wrinkle/shadow pixels in a given region are replaced by values derived from the values of Red, Green and Blue channels of non-wrinkle/non-shadow pixels in the neighbourhood of tire wrinkle/shadow pixels. In this embodiment, pixel flooding begins with pixels at the boundaries of clusters of wrinkle/shadow pixels, so as to calculate modified pixel RGB channel values of pixels based on the value of RGB channels of pixels that are not wrinkle/shadow pixels.

A modified channel value for a pixel at position (x, y) at the boundary of a cluster of wrinkle/shadow pixels in the input digital image having M rows and N columns of pixels, is calculated as in Equation 3 below:

$$P(x, y) = \frac{1}{Ns} \sum_{x'=x-d}^{x+d} \sum_{y'=y-d}^{y+d} P(x', y') \qquad (3)$$

where:
0≤x;
x'≤N;
0≤y;
y'≤M;

2d+1 is the distance of boundary of tire neighbourhood; and

Ns is the number of non wrinkle/shadow pixels in the neighbourhood.

Each of the R, G and B channel modified values are calculated as above.

The user may select to identify and modify shadow pixels in a given region where Deep Wrinkles are observed, or to identify and modify the wrinkle pixels where light Wrinkles are observed. As can be seen in FIGS. 8 and 9, in this embodiment, the single slider control 938 for each of the left and right Nasolabial Fold regions and a single slider control 944 for each of the left and right. Oral Commissure regions each provide the user with the ability to modify either the shadow and wrinkle pixels in these regions, one or the other being modified depending upon whether the Deep Wrinkles radio box is selected or the light Wrinkles radio box is selected.

It will be noted that, in this embodiment, the slider controls have a range of from zero (0) to one hundred and twenty (120). When a slider control is moved to a position above 0, the corresponding displayed region in the "Smoothed" image is a combination of the input digital image and the modified wrinkle/shadow pixel channels' values for that region. As such, the slider control for each region provides the user with the ability to control the amount of relative contribution to the displayed "Smoothed" image of the input digital image pixel channel values and the corresponding modified wrinkle/shadow pixels. For example, when the slider control for a particular region is at zero (0), what is displayed in that particular region is simply the original channel values of the input digital image. However, when, the slider control for a particular region is a forty (40), for example, what is displayed in that particular region is original non-wrinkle/non-shadow pixels along with wrinkle/shadow pixels whose channel values are equal to tire sum of 40/120 of the pixel channels' modified values and 80/120 of the pixel channels' original values. Similarly, when the slider control for the particular region is moved to 75, for example, what is displayed in that particular region is original non-wrinkle/non-shadow pixels along with wrinkle/shadow pixels whose channel values are equal to the sum of 75/120 of the pixel channels' modified values and 45/120 of the pixel channels' original values.

The various selectable range of values for a slider are defined for each region such that, while each have a 0 to 120 range, the 100 value represents a change in pixel channels' values that is expected to represent the maximum aesthetically-pleasing change for the particular region. It is to be noted that the 100 value for a given region is merely a visual guidepost or initial recommendation for that region based, on the inventors' consideration of a large number of sample images and what, for a majority of the sample images, would represent an approximation of the maximum aesthetically-pleasing change in pixel channels' values. That is, the 100 value does not indicate a 100 percent change in pixel value, or some other fixed, percentage or amount of change in the pixel value; it is merely a visual reference with no empirical relationship to the algorithms. It will be understood that the 100 value is merely a general approximation for assisting a user, and is not expected to exactly match, or actually represent the actual maximum aesthetically-pleasing change for any particular subject.

The 120 value represents the maximum pixel change in a particular region that is available to die user. This additional range above 100 is provided in order to enable a user to manually hone in on an approximate maximum aesthetically-pleasing change (i.e, to go above 100 if desired for a particular subject ), and also to provide headroom to allow the user to depict for a given subject how an over-correction might appear.

Although embodiments have been described with reference to the drawings, those of skill in the art will appreciate that variations and modifications may be made without departing from the scope of the invention as defined by the appended claims.

For example, while in embodiments described herein modifications to pixel values are directed by a user, in alternative embodiments with wrinkle pixels having been identified various modifications to the values of the wrinkle pixels may be done without requiring specific user input. In one example, rather than make granular adjustments, the user may simply specify a proposed cosmetic procedure, after which wrinkle pixels corresponding to wrinkles that would be modified by such, a cosmetic procedure could be automatically modified and then, optionally, fine-tuned by a user.

Furthermore, various types of controls may be made available to a user to enable modifications of pixel values. For example, a user may be provided with a single control that permits modifications to values of pixels in two regions at once, such as in both Oral Commissures regions.

Furthermore, while in embodiments described only values of Red channels of pixels are compared during identification of wrinkle pixels, alternatives are possible. For example, the values of each of the Red, Blue and Green channels of a pixel may be compared to the Red, Blue and Green channels, respectively, of another pixel. Alternatively, modifications may be made to conduct comparisons of pixel values in one of the HSL (hue-saturation-lightness), HSV (hue-saturation-value), HSI (hue-saturation-intensity) colour spaces, or some other colour space.

What is claimed is:

1. A computer-implemented method of processing an input digital image, the method comprising:
   forming a representation of the input digital image as wavelet components; and
   for each of a plurality of facial regions in the input digital image:
      forming a reconstructed facial region based on a subset of the wavelet components, the subset of the wavelet components for the facial region differing from a subset of the wavelet components for at least one other facial region of the plurality of facial regions; and
      identifying pixels associated with facial wrinkles in the facial region as pixels in the reconstructed facial region that differ from corresponding pixels in the facial region by a first threshold amount.

2. The method of claim 1, wherein the subset of wavelet components for each of the one or more facial regions is based on a respective expected wrinkle pattern within each facial region.

3. The method of claim 2, wherein the expected wrinkle pattern comprises at least one expected wrinkle direction.

4. The method of claim 3, wherein the subset of wavelet components for each of the facial regions is absent at least one low-frequency wavelet component corresponding to at least one expected wrinkle direction.

5. The method of claim 4, wherein the subset of wavelet components for at least one of the facial regions is absent at least one low-frequency wavelet component corresponding to a plurality of expected wrinkle directions.

6. The method of claim 3, wherein the subset of wavelet components for at least one of the facial regions is absent a plurality of low-frequency wavelet components corresponding to at least one expected wrinkle direction.

7. The method of claim 3, wherein the at least one expected wrinkle direction is/are selected from the group consisting of: horizontal direction, vertical direction, and diagonal direction.

8. The method of claim 1, wherein the first threshold amount is calculated based on the contents of the facial region.

9. The method of claim 1, further comprising:
   for one or more facial region in the input digital image:
      identifying pixels associated with shadows in the facial region as pixels having an intensity that is below a second threshold amount.

10. The method of claim 9, further comprising:
    determining the second threshold amount adaptively.

11. The method of one of claims 1 to 10, further comprising:
    forming a modified digital image based on the input digital image and modified values of pixels identified as associated with facial wrinkles.

12. The method of claim 11, wherein the forming is responsive to receipt of user instructions.

13. The method of claim 11, wherein the modified value of a pixel is based on values of a plurality of pixels in a neighborhood of the pixel.

14. The method of one of claims 11 to 13, further comprising:
    forming the modified digital image also based modified values of pixels identified as associated with temple regions in the input digital image.

15. The method of claim 11 when dependent on claim 9, further comprising:
    forming the modified digital image based on the input digital image and modified values of pixels identified as associated with shadows.

16. A non-transitory computer readable medium embodying a computer program executable on a computing system for processing an input digital image, the computer program comprising:
    computer program code for forming a representation of the input digital image as wavelet components; and
    computer program code for, for one or more of a plurality of facial regions in the input digital image:
       forming a reconstructed facial region based on a subset of the wavelet components, the subset of the wavelet components for the facial region differing from a subset of the wavelet components for at least one other facial region of the plurality of facial regions; and
       identifying pixels associated with facial wrinkles in the facial region as pixels in the reconstructed facial region that differ from corresponding pixels in the facial region by a first threshold amount.

17. The non-transitory computer readable medium of claim 16, wherein the computer program further comprises:
    computer program code for forming a modified digital image based on the input digital image and modified values of pixels identified as associated with facial wrinkles.

18. A computing system comprising at least one processor executing instructions for processing an input digital image, the at least one processor configured therewith to form a representation of the input digital image as wavelet components and, for one or more of a plurality of facial regions in the input digital image, form a reconstructed facial region based on a subset of the wavelet components, the subset of the wavelet components for the facial region differing from a subset of the wavelet components for at least one other facial region of the plurality of facial regions, and identify pixels associated with facial wrinkles in the facial region as pixels in the reconstructed facial region that differ from corresponding pixels in the facial region by a first threshold amount.

19. The computing system of claim 18, where the at least one processor is further configured to form a modified digital image based on the input digital image and modified values of pixels identified as associated with facial wrinkles.

\* \* \* \* \*